(12) United States Patent
Scherson et al.

(10) Patent No.: US 10,202,293 B2
(45) Date of Patent: Feb. 12, 2019

(54) DETECTION AND REMOVAL OF SELENATE FROM AQUEOUS SOLUTION

(71) Applicant: Case Western Reserve University, Cleveland, OH (US)

(72) Inventors: Daniel A. Scherson, Beachwood, OH (US); Jonathan Strobl, Cleveland, OH (US)

(73) Assignee: CASE WESTERN RESERVE UNIVERSITY, Cleveland, OH (US)

( * ) Notice: Subject to any disclaimer, the term of this patent is extended or adjusted under 35 U.S.C. 154(b) by 0 days.

(21) Appl. No.: 15/689,049

(22) Filed: Aug. 29, 2017

(65) Prior Publication Data

US 2018/0057371 A1    Mar. 1, 2018

Related U.S. Application Data

(60) Provisional application No. 62/380,526, filed on Aug. 29, 2016.

(51) Int. Cl.
| | | |
|---|---|---|
| *C02F 1/46* | (2006.01) | |
| *C02F 1/461* | (2006.01) | |
| *C02F 1/58* | (2006.01) | |
| *C01B 19/00* | (2006.01) | |
| *C25B 11/04* | (2006.01) | |
| *C02F 101/10* | (2006.01) | |

(52) U.S. Cl.
CPC ........ *C02F 1/46109* (2013.01); *C01B 19/008* (2013.01); *C02F 1/58* (2013.01); *C25B 11/0415* (2013.01); *C25B 11/0447* (2013.01); *C02F 2001/46138* (2013.01); *C02F 2101/106* (2013.01); *C02F 2201/46135* (2013.01)

(58) Field of Classification Search
CPC .................... C02F 1/46109; C02F 1/58; C02F 2001/46138; C02F 2201/46135; C02F 2101/106; C25B 11/0447; C25B 11/0415; C01B 19/008
See application file for complete search history.

(56) References Cited

U.S. PATENT DOCUMENTS

| | | |
|---|---|---|
| 6,251,283 B1 | 6/2001 | Centofanti et al. |
| 7,413,664 B2 | 8/2008 | Lord, III et al. |
| (Continued) | | |

OTHER PUBLICATIONS

Alanyalioglu, Murat, Umit Demir, and Curtis Shannon. "Electrochemical formation of Se atomic layers on Au (1 1 1) surfaces: the role of adsorbed selenate and selenite." Journal of Electroanalytical Chemistry 561 (2004): 21-27.

(Continued)

*Primary Examiner* — Arun S Phasge
(74) *Attorney, Agent, or Firm* — Tarolli, Sundheim, Covell & Tummino LLP

(57) ABSTRACT

Systems and methods for detecting and/or removing selenate from an aqueous selenate-containing solution are described. The method includes adding sufficient acid to the aqueous selenate-containing solution to acidify the aqueous selenate-containing solution; contacting the acidic aqueous selenate-containing solution with an underpotential deposited copper-coated electrode; and removing selenate from the aqueous selenate-containing solution by forming copper-selenide on the underpotential copper-coated electrode.

22 Claims, 5 Drawing Sheets

(56) References Cited

U.S. PATENT DOCUMENTS

| | | |
|---|---|---|
| 7,419,606 B2 | 9/2008 | Johnson et al. |
| 2016/0289092 A1* | 10/2016 | Kratochvil ................ C02F 1/42 |

OTHER PUBLICATIONS

Andrews, Richard W., and Dennis C. Johnson. "Voltammetric deposition and stripping of selenium (IV) at a rotating gold-disk electrode in 0.1 M perchloric acid." Analytical chemistry 47.2 (1975): 294-299.

Angerstein-Kozlowska, H., et al. "Elementary steps of electrochemical oxidation of single-crystal planes of Au—I. Chemical basis of processes involving geometry of anions and the electrode surfaces," Electrochimica Acta 31.8 (1986): 1051-1061.

Baeshov, A.; et al., "Electrocatalytic Reduction of Selenium(VI) in Hydrochloric Acid", Doklady, Chemical technology, Akademiia Nauk SSSSR, 1984, vol. 278(3), pp. 646-648.

Czerniawski, Justin M., Brian R. Perdue, and John L. Stickney. "Potential Pulse Atomic Layer Deposition of Cu2Se." Chemistry of Materials 28.2 (2016): 583-591.

Gruebel, Karen A., James A. Davis, and James O. Leckie. "Kinetics of oxidation of selenite to selenate in the presence of oxygen, titania, and light." Environmental science & technology 29.3 (1995): 586-594.

Hageman, Simon PW, et al. "Microbiological selenate to selenite conversion for selenium removal." Water research 47.7 (2013): 2118-2128.

Huang, Baoming M., Tedd E. Lister, and John L. Stickney. "Se adlattices formed on Au (100), studies by LEED, AES, STM and electrochemistry." Surface science 392.1-3 (1997): 27-43.

Ivandini, Tribidasari A., and Yasuaki Einaga. "Electrochemical detection of selenium (IV) and (VI) at gold-modified diamond electrodes." Electrocatalysis 4.4 (2013): 367-374.

Kozhakov, BE, et al. "Kinetic Wave of the Difficultly Reduced Selenate Ion on a Lead Electrode in a Sulfuric-Acid Solution." Soviet Electrochemistry 21.4 (1985): 505-506.

Lister, T. E., and J. L. Stickney. "Atomic level studies of selenium electrodeposition on gold (111) and gold (110)." The Journal of Physical Chemistry 100.50 (1996): 19568-19576.

Burton, J. D. "Gas chromatographic method for the determination of selenite and total selenium in sea water." Analytica Chimica Acta 120 (1980): 177-186.

Moore, Lucas Ph.D. and Mahmoudkhani, Amir Ph.D., "Methods for removing selenium from aqueous systems", Proceedings Tailings and Mine Waste 2011, Vancouver, BC, Nov. 6 to 9, 2011, pp. 1-11.

Murphy, Andrew P. "Removal of selenate from water by chemical reduction." Industrial & engineering chemistry research 27.1 (1988): 187-191.

Reinsel, Mark "Selenium Removal Technologies: A Review", Water Online, Jan. 15, 2016, pp. 1-5.

Riveros, G., et al. "Electrochemical study concerning the deposition of copper on selenium covered gold electrodes." Journal of Electroanalytical Chemistry 504.2 (2001): 160-165.

Santos, Silvia, et al. "Selenium contaminated waters: an overview of analytical methods, treatment options and recent advances in sorption methods." Science of the Total Environment 521 (2015): 246-260.

Xing, Xuekun, and Daniel Scherson. "Electrocatalytic properties of metal adatoms in a potential range negative to Nernstian bulk deposition." Journal of Electroanalytical Chemistry and Interfacial Electrochemistiy 270.1-2 (1989): 273-284.

Xu, Jing, and Daniel Scherson. "Quantitative Correlations between the Normal Incidence Differential Reflectance and the Coverage of Adsorbed Bromide on a Polycrystalline Platinum Rotating Disk Electrode." Analytical chemistry 85.5 (2013): 2795-2801.

\* cited by examiner

DETECTION AND REMOVAL OF SELENATE FROM AQUEOUS SOLUTION

CONTINUING APPLICATION DATA

This application claims the benefit of U.S. Provisional Application Ser. No. 62/380,526, filed Aug. 29, 2016, which is incorporated by reference herein.

STATEMENT REGARDING FEDERALLY SPONSORED RESEARCH

This invention was made with government support under grant CHE-1412060 awarded by the National Science Foundation. The Government has certain rights in this invention.

BACKGROUND OF THE INVENTION

Selenium, an essential micronutrient commonly found in water in the form of selenate, $SeO_4^{2-}$, and/or selenite, $SeO_3^{2-}$, requires monitoring and control given its toxicity when ingested beyond prescribed levels. Only a few methods for the removal of these oxyanions from water, involving primarily adsorption on metal oxides, have been described in the literature. In addition, efforts have been made toward developing electrochemical techniques for the detection and capture of these species from industrial effluents and other sources. From an overall perspective, both $SeO_4^{2-}$ and $SeO_3^{2-}$ are relatively stable both to oxidation and reduction. In particular, $SeO_4^{2-}$ has been regarded as particularly inert and only a few papers have reported its reduction under room temperature conditions. See Santos et al., Sci. Tot. Env., 521-522, 246 (2015) and C. I. Measures and J. D. Burton, Anal. Chim. Acta., 120, 177 (1980).

SUMMARY OF THE INVENTION

Voltammetric techniques have been employed to show that underpotential deposited Cu on polycrystalline Au electrodes in aqueous 0.1 M $HClO_4$ catalyzes the reduction of purified selenate, $SeO_4^{2-}$, to yield a layer of adsorbed copper selenide, $Cu_xSe$. Subsequent oxidation of this layer led to the loss of Cu, leaving behind adsorbed, elemental Se, which could be oxidized to selenite, $SeO_3^{2-}$, at higher potentials. Application of this method made it possible to detect $SeO_4^{2-}$ down to nM levels. Voltammetric features observed on Au(poly) in $Cu^{2+}$-free 0.1 M $HClO_4$ containing $SeO_4^{2-}$ reported earlier in the literature could be attributed to the reduction of $SeO_3^{2-}$ impurities present in the commercial chemical.

BRIEF DESCRIPTION OF THE FIGURES

The present invention may be more readily understood by reference to the following figures wherein.

DETAILED DESCRIPTION OF THE INVENTION

Definitions

Unless otherwise defined, all technical and scientific terms used herein have the same meaning as commonly understood by one of ordinary skill in the art to which this application pertains. Although methods and materials similar or equivalent to those described herein can be used in the practice or testing of the exemplary embodiments, suitable methods and materials are described below. In case of conflict, the present specification, including definitions, will control. In addition, the materials, methods, and examples are illustrative only and not intended to be limiting.

The terminology as set forth herein is for description of the embodiments only and should not be construed as limiting the application as a whole. Unless otherwise specified, "a," "an," "the," and "at least one" are used interchangeably. Furthermore, as used in the description of the application and the appended claims, the singular forms "a", "an", and "the" are inclusive of their plural forms, unless contraindicated by the context surrounding such.

The recitations of numerical ranges by endpoints include all numbers subsumed within that range (e.g., 1 to 5 includes 1, 1.5, 2, 2.75, 3, 3.80, 4, 5, etc.).

Selenium is a non-metal chemical element with symbol Se. The term selenium, as used herein, refers to selenium generally, or in its elemental state. Although selenium is an essential trace element, it is toxic if taken in excess. Other forms of selenium referred to herein include selenate, selenide, and selenite. Selenate is an oxoacid of selenium having the formula $SeO_4^{2-}$. Selenide is a chemical compound containing a selenium anion with oxidation number of −2. An example of a selenide is copper selenide. Selenite is an oxoacid of selenium having the formula $SeO_3^{2-}$.

Removing Selenate from a Selenate-Containing Aqueous Solution

Figure 1:
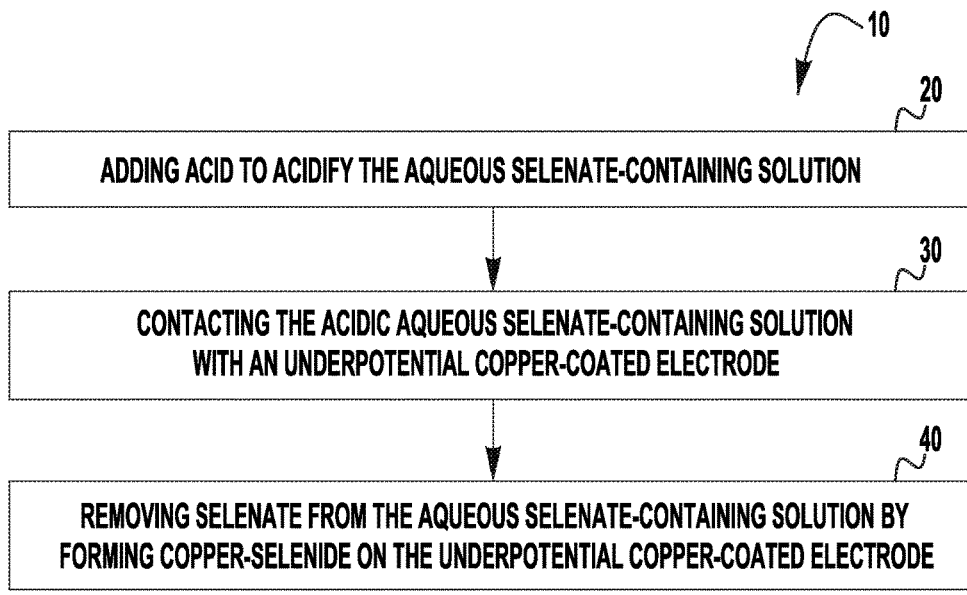
FIG. 1 provides a scheme showing a method for removing selenate from an aqueous selenate-containing solution.

In one aspect, the present invention provides a method for removing selenate from an aqueous selenate-containing solution. A scheme 10 representing this method is shown by FIG. 1. The method for removing selenate includes the steps of adding sufficient acid to the aqueous selenate-containing solution to acidify the aqueous selenate-containing solution 20; contacting the acidic aqueous selenate-containing solution with an underpotential copper-coated electrode 30; and removing selenate from the aqueous selenate-containing solution by forming copper-selenide on the underpotential copper-coated electrode 40. In some embodiments, the removed selenate is simply treated as waste, while in other embodiments the removed selenate can be further purified, if necessary, and used as a valuable product. For example, selenium is used in the production of light meters, copy machines, solar cells, and anti-dandruff shampoos.

Copper itself is not a good catalyst for selenate reduction. However, the copper the inventors found to be active is formed at potentials at which "bulk" copper would dissolve. The active copper for selenate reduction requires for the Cu to be adsorbed on Au at monolayer or submonolayer coverages in a phenomenon called underpotential deposition. A monolayer is a single atom thick layer (of copper) that covers substantially all of the surface of the electrode contacting the aqueous solution, whereas a submonolayer is a partial single atom thick layer covering a portion of the electrode contacting the aqueous solution. For example, a submonolayer can cover from 5% to 95%, from 10% to 80%, from 20% to 70%, or from 30% to 60% of the electrode surface contacting the aqueous solution.

In some embodiments, the underpotential copper-coated electrode is formed by contacting an electrode with an acidic copper-containing aqueous solution and applying sufficient potential to the electrode to form an underpotential copper-coated electrode. The potential range for copper underpotential deposition can vary depending on the concentration of $Cu^{2+}$ present in the aqueous solution. In some embodiments, such as those where the $Cu^{2+}$ concentration is about 1 mM, sufficient potential is supplied when the potential of the electrode is from about 0.55 to 0.33 V versus the reversible hydrogen electrode (RHE) during formation of the copper-coated electrode. In some embodiments, the copper-containing aqueous solution is formed by contacting an acidic aqueous selenate-containing solution with a copper (II) salt. Examples of copper (II) salts include $Cu(ClO_4)$, $CuSO_4$, $CuCl_2$, $CuBr_2$, and $CuF_2$. A wide variety of other suitable copper (II) salts are known to those skilled in the art.

In further embodiments, the electrode is a gold electrode. In yet further embodiments, the method comprising the step of regenerating the electrode. For example, the electrode can be regenerated by removing copper from the copper-selenide-coated electrode by raising the potential above 0.7 V vs RHE, and then releasing selenium from the electrode by raising the electrode potential above 1.0 V vs. RHE. In yet further embodiments, the acidic aqueous selenate-containing solution has a pH from about 0.8 to about 1.5, while in additional embodiments, the acid used in the method is $HClO_4$. In additional embodiments, the method can be used to remove selenite in addition to selenate.

Methods of removing and/or detecting selenate from an aqueous solution can be carried out on a variety of different types of aqueous solutions. Examples of aqueous solutions include groundwater, waste water, drinking water, ballast water, aquarium water, and aquaculture water. In some embodiments, the aqueous solution is drinking water. In other embodiments, the aqueous solution is waste water. Waste water can be contaminated with selenium as a result of industrial processes, and can include levels of selenium ranging from 10 mg/L to about 100 mg/L, and in some extreme cases, up to 1,000 mg/L of selenium. The current legally allowed level of selenium is released waste water is only 1 mg/L.

Methods of removing and/or detecting selenate from an aqueous solution can be carried out at any temperature in which the aqueous solution is in a liquid state. For example, the methods can be carried out at any temperature within the range of 0° C. to 100° C. In some embodiments, the method of removing and/or detecting selenate is carried out at a temperature within the range of 10° C. to 40° C., while in other embodiments the method is carried out at a temperature close to room temperature (i.e., a range from 15° C. to 25° C.).

Selenate can also undergo reduction during copper deposition. In this case, however, the potential required would be more negative than in the case of underpotential deposition conditions and a large fraction of the current would generate bulk Cu, thereby reducing the overall efficiency of the process. For example, a potential of <0.33 V at a 1 mM concentration of $Cu^{2+}$ leads to reduction of copper and selenate together and in bulk.

Detecting Selenate in an Selenate-Containing Aqueous Solution

Figure 2:
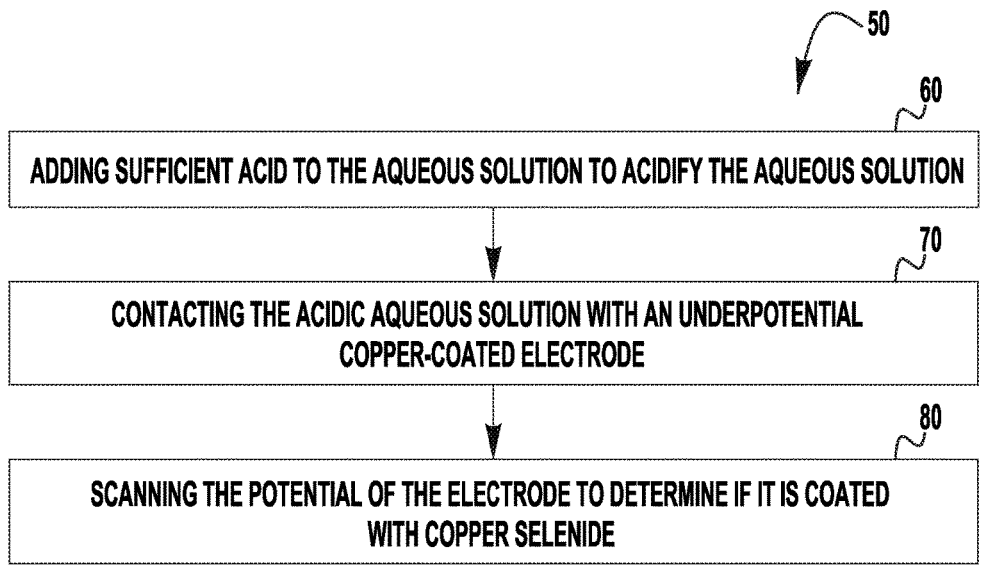
FIG. 2 provides a scheme showing a method for detecting selenate in an aqueous solution.

In another aspect, the present invention provides a method for detecting selenate in an aqueous solution. FIG. 2 provides a scheme 50 showing a method for detecting selenate. The method of detecting selenate includes the steps of adding sufficient acid to the aqueous solution to acidify the aqueous solution 60; contacting the acidic aqueous solution with an underpotential copper-coated electrode 70; and scanning the potential of the electrode above 1.0 V vs. RHE to determine if it is coated with copper selenide 80. Scanning the potential refers to applying a variety of potentials (above 1.0 V vs. RHE) to determine the selenium content of the copper selenide deposited. For example, the potential can be varied from 1.05 to 1.3 V to determine the amount of selenium present.

The electrode should be one suitable for underpotential deposition of Cu. In some embodiments, the electrode is a gold electrode. In further embodiments, the copper-coated electrode is formed by contacting an electrode with an acidic copper-containing aqueous solution and applying sufficient potential to the electrode to form an underpotential copper-coated electrode. In other embodiments, the potential of the electrode is from about 0.55 to 0.33 V RHE during formation of the copper-coated electrode. In yet further embodiments, the acidic aqueous solution has a pH from about 0.8 to about 1.5, while in additional embodiments the acid used in the method is $HClO_4$.

A System for Detecting or Removing Selenate from an Aqueous Solution

Figure 3:
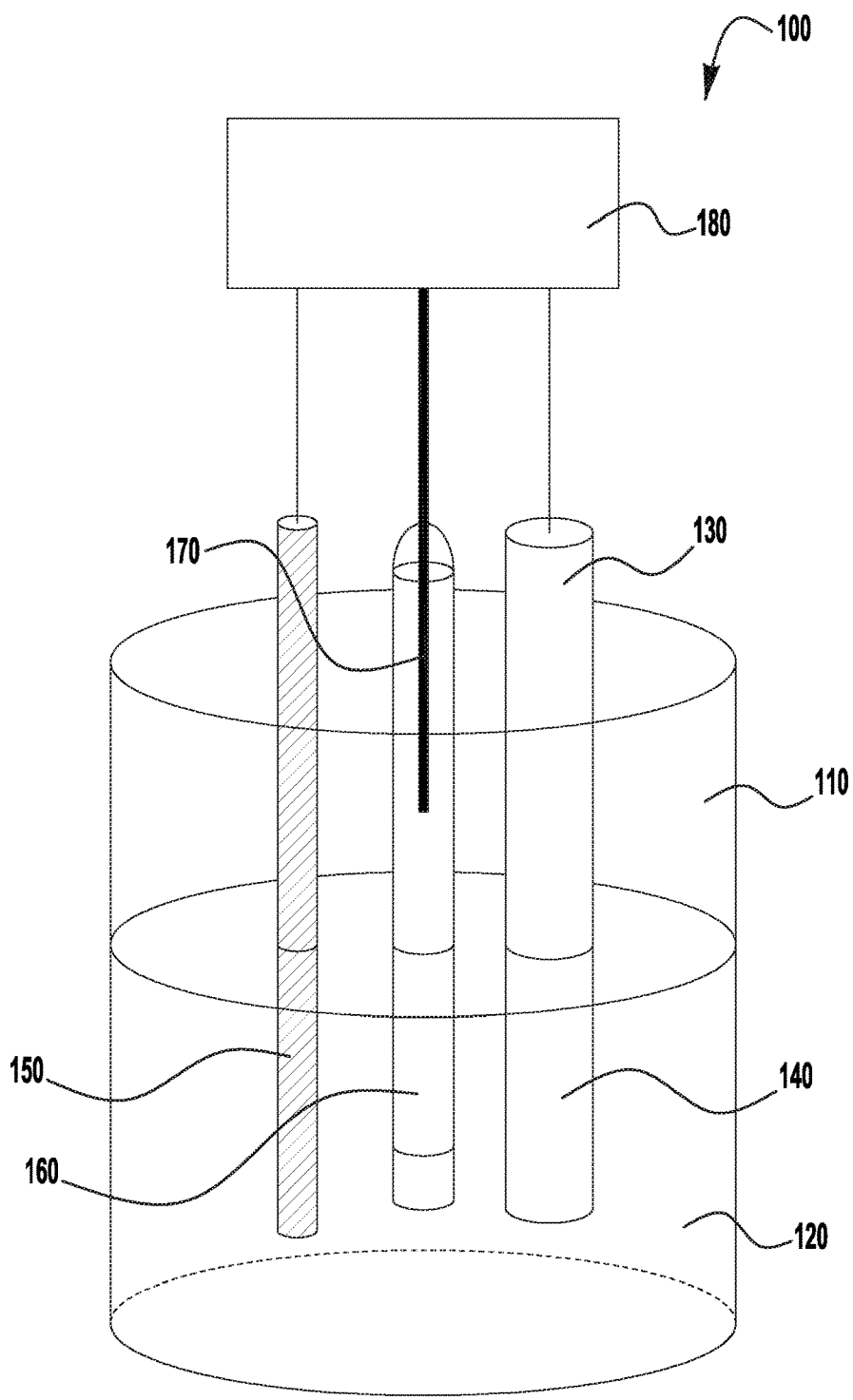
FIG. 3 provides a scheme showing a system for detecting or removing selenate from an aqueous solution.

In another aspect, the present invention provides a system for detecting and/or removing selenate from an aqueous solution. FIG. 3 provides a scheme 100 showing a system for detecting and removing selenate. The system includes a first container 110 holding an acidic aqueous solution including selenate 120; an underpotential electrode 130 with a copper coating 140 positioned in contact with the acidic aqueous solution including selenate; a counter electrode (e.g., a graphite rod) 150 positioned in contact with the acidic aqueous solution including selenate, and a RHE electrode 160 including a wire 170 positioned in contact with the acidic aqueous solution including selenate. A typical RHE electrode, as shown in the figure, is an enclosed compartment including a porous frit at the end in contact with the aqueous solution, an electrolyte solution corresponding to that present in the first container, a platinum wire contacting the electrolyte in the RHE electrode, and a hydrogen gas bubble at the top of the electrode. The RHE electrode is a reference electrode that has a stable and well-known electrode potential. The electrodes are connected to voltage source (i.e., a potentiostat) 180 that is capable of applying a voltage to the underpotential copper-coated electrode, wherein application of voltage to the copper-coated electrode converts the electrode to a copper-selenide-coated electrode.

In some embodiments, the underpotential electrode is a gold electrode. In further embodiments, the system further comprises a reference electrode. In further embodiments, the copper-coated electrode is formed by contacting an electrode with an acidic copper-containing aqueous solution and applying sufficient potential to the electrode to form an underpotential copper-coated electrode. In additional embodiments, the system further comprises a second container holding an aqueous solution for receiving selenite from the copper-selenide-coated electrode. In yet further embodiments, the acidic aqueous solution has a pH from about 0.8 to about 1.5.

The following examples are included for purposes of illustration and are not intended to limit the scope of the invention.

EXAMPLES

Example 1: Copper-Mediated Reduction of Selenate on Gold Electrodes in Acidic Solutions This example describes a new method that allows purified $SeO_4^{2-}$ to be reduced on polycrystalline Au, Au(poly), in acidic solutions containing $Cu^{2+}$ at room temperature without prior pretreatment, allowing its direct detection and removal. The first step in the process involves formation of a thin layer of copper selenide, $Cu_xSe$, in the Cu underpotential deposition, UPD, region of Au(poly). In a subsequent step, Cu in the layer is oxidatively stripped, leaving behind an adsorbed layer of elemental Se, which undergoes oxidation at higher potentials generating $SeO_3^{2-}$. Additional studies involving purified $SeO_4^{2-}$ provided strong evidence that earlier reports claiming direct reduction of $SeO_4^{2-}$ were likely compromised by the presence of trace $SeO_3^{2-}$ in the as received selenate salts. Ivandini, T. A.; Einaga, Y., Electrocatalysis, 4, 367-374 (2013); Kozhakov et al., Electrokhimiya, 21, 550 (1985).

Experimental

Fresh 0.1 M $HClO_4$ solutions were prepared before each set of experiments using high purity concentrated $HClO_4$ (Sigma Aldrich/Fluka, Traceselect) and ultrapure water (UPW) supplied by an EASYpure UV water purification system (Barnstead-Thermolyne Corp). Two types of crystalline sodium selenate of different purities were obtained from Alfa Aesar, i.e. 99.9%, (decahydrate), and 99.8% (anhydrous), containing, respectively, less than 0.01% and 0.15% selenite by mass. These will be denoted hereafter as HP and LP. Sodium selenite, rated at 44-48% selenium by mass in the anhydrous form, was purchased from Acros Organics. Copper (II) perchlorate hexahydrate was supplied by Aldrich (98%).

For most of the experiments, selenite, present as an impurity in commercial HP $Na_2SeO_4$, was removed using the method of Gruebel et al., which, according to these authors, is close to 100% effective for eliminating $SeO_3^{2-}$ at concentrations on the order of 10 μM in solutions of pH ≤3. Gruebel et al., Environmental Science & Technology, 29 (3), 586-594 (1995). In our case, ca. 30 g/L of $TiO_2$ (Aldrich, 99.9+%, 1 μm particle size) were dispersed in ca. 0.2 M $SeO_4^{2-}$ solutions prepared with HP grade material in 0.1 M $HClO_4$, which corresponds to three times the loading employed in the original reference, and kept under stirring overnight. The mixture was then filtered and the same amount of fresh $TiO_2$ added to the solution. This procedure was repeated three times, yielding what will be referred to hereafter as purified $SeO_4^{2-}$. The actual concentration of $SeO_4^{2-}$ in such purified solutions was determined by transmission UV-Vis spectroscopy, using the absorbance at 220 nm, i.e. within the shoulder found between 240 and 190 nm, for standardization.

Before each set of experiments, the glassware was cleaned by first soaking overnight in a 9:1 mixture of concentrated $H_2SO_4$:30% $H_2O_2$ (highly oxidizing and corrosive, should be handled with care), followed by rinsing with large amounts of ultrapure water (UPW), and subsequently boiled in UPW three times, rinsing with UPW in between. The carbon counter electrode was rinsed with UPW, and the $H_2$ bubble reversible hydrogen reference electrode (RHE) was filled with fresh electrolyte before each experiment. Two Au working electrodes were used: a Au wire (Alfa Aesar, Premion, 99.999%) and Au rotating disk electrode, RDE, (Pine Instrument Company, $r_{disk}$=0.25 cm). The wire was cleaned by flame-annealing in a gas flame, and then immersed while hot into UPW, whereas the RDE was first placed in a 0.1 M $HClO_4$ solution overnight. Subsequently, both types of electrodes were transferred to the electrochemical cell filled with 0.1 M $HClO_4$, which was then deaerated for 10 min with $N_2$ (Airgas, High Purity 4.8 grade). Prior to experiments, both types of Au electrodes were cycled linearly in this electrolyte between 0.0 and 1.85 V at a rate v=0.2 V/s for ca. 15 min, sufficient for the electrode to exhibit voltammetry characteristic of clean Au(poly). Angerstein-Kozlowska et al., Electrochim. Acta, 31, 1051 (1986). At this stage, aliquots of concentrated analyte solutions were added to the solution to yield the desired final concentrations. All electrochemical measurements were performed with an Autolab potentiostat (Metrohm) equipped with a true linear potential scan module (Scan250).

The actual areas of the Au working electrodes were determined from CVs in 0.5 M $H_2SO_4$ assuming a charge density of 400 μC/cm² for the formation of Au oxide between 1.25 and 1.7 V vs RHE, yielding for the Au RDE a roughness factor of 1.4.

Results and Discussion

Figure 4:
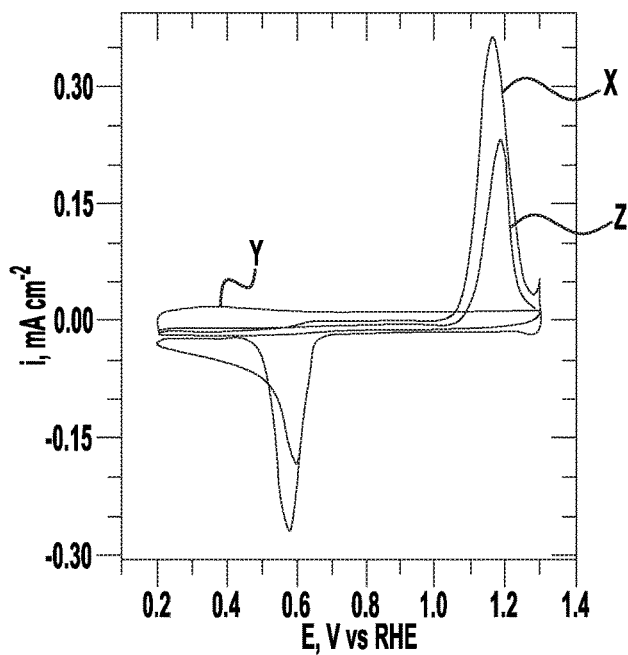
FIG. 4 provides a graph showing steady state cyclic voltammograms recorded with a gold (Au) wire in a solution 1 mM $Na_2SeO_4$ (LP) before (X curve) and after purification (Y curve) in 0.1 M $HClO_4$ at a scan rate v=0.2 V/s. The Z curve was obtained in a solution 1.5 μM $Na_2SeO_3$ in 0.1 M $HClO_4$ under otherwise identical conditions.

In agreement with earlier claims in the literature, (T. A. Ivandini and Y. Einaga, Electrocatalysis, 4, 367 (2013)) the cyclic voltammogram of the Au(poly) wire in 0.1 M $HClO_4$ containing 1 mM $Na_2SeO_4$ (LP) (X curve, FIG. 4), displayed redox peaks centered at 1.2 and 0.6 V in the scans toward positive and negative potentials, respectively. Both peaks disappeared, however, when the same experiment was carried out using purified $Na_2SeO_4$ solutions (Y curve), indicating that $SeO_4^{2-}$ does not undergo reduction on Au(poly) in 0.1 M $HClO_4$. In fact, the features observed for commercial $Na_2SeO_4$ (see X curve, FIG. 4) could be largely reproduced in 0.1M $HClO_4$ (Z curve, FIG. 4), containing 1.5 μM $Na_2SeO_3$. The peaks observed using as received $Na_2SeO_4$ can be ascribed to the reduction of $SeO_3^{2-}$ to yield adsorbed elemental Se (peak at 0.6 V), which is then reportedly re-oxidized back to adsorbed $SeO_3^{2-}$ at ca. 1.2 V. Alanyalioglu et al., J. Electroanal. Chem., 561, 21 (2004). This clearly indicates that earlier results published in the literature claiming a direct electroreduction of $SeO_4^{2-}$ were almost certainly compromised by $SeO_3^{2-}$ contamination in the commercial selenate employed.

A series of experiments were then carried out in purified 1 mM $Na_2SeO_4$ in 0.1M $HClO_4$ containing 1.2 mM $Cu(ClO_4)_2$ using the Au RDE rotating at $\omega$=1500 rpm. For these measurements, the potential of the disk was poised at two different values, $E_{hold}$, in the UPD Cu regime, i.e. $E_{hold}$=0.325 (Panel A) and 0.425 V vs RHE (Panel C) for different periods of time, thold=10 (Q), 100 (W) and 1000 s (X), and then scanned anodically at a rate v=0.1 V/s. As shown by these data, all linear scans displayed the same oxidation peak at 1.15 V found in FIG. 4. This feature was not observed, however, when only purified 1 mM $Na_2SeO_4$ (Y, Panel A) or 1.2 mM $Cu(ClO_4)_2$ (Z, Panel A) were individually added to 0.1 M $HClO_4$, even for $t_{hold}$=1000 s. Inspection of the data revealed an increase in the magnitude of the peak with $t_{hold}$, or decreases in $E_{hold}$, consistent with a potential dependent, kinetically controlled reduction process. Similar oxidation features were reported on Au(poly) following reduction of $SeO_3^{2-}$ from Cu(II)-containing solutions and assigned to the stripping of Cu from one or more forms of copper selenide (peaks below 0.7 V), (Riveros et al., J. Electroanal. Chem., 504, 160 (2001)) leaving behind adsorbed Se, which is then oxidized at 1.15 V yielding adsorbed $SeO_3^{2-}$ as discussed before. Angerstein-Kozlowska et al., Electrochim. Acta, 31, 1051 (1986). It may be concluded that UPD Cu promotes the reduction of $SeO_4^{2-}$ to yield CuSe and that the features below 0.7 V can be assigned to the stripping of Cu from this layer to yield elemental Se. The charge under the peak at 1.15 V was determined for each of the solid curves in Panel A, FIG. 5, by integrating the current between 1.05-1.3 V and then subtracting contributions due to the interfacial capacitance of Au(poly) measured during an anodic scan initiated at 0.7 V. This quantity, denoted as $q_{Se}$, provides a measure of the amount of adsorbed Se, and yielded values of 33, 135, and 358 $\mu$C cm$^{-2}$ for $t_{hold}$=10, 100 and 1000 s, respectively. Formation of CuSe and $Cu_2Se$ in bulk form from $SeO_4^{2-}$ and Cu(II) would be thermodynamically favored below 0.522 and 0.488 V, respectively, but the $q_{Se}$ values are too small to account for Se coverages on Au(poly) much in excess of a monolayer. In short, a bulk deposit of copper selenide is not formed.

Figure 5:
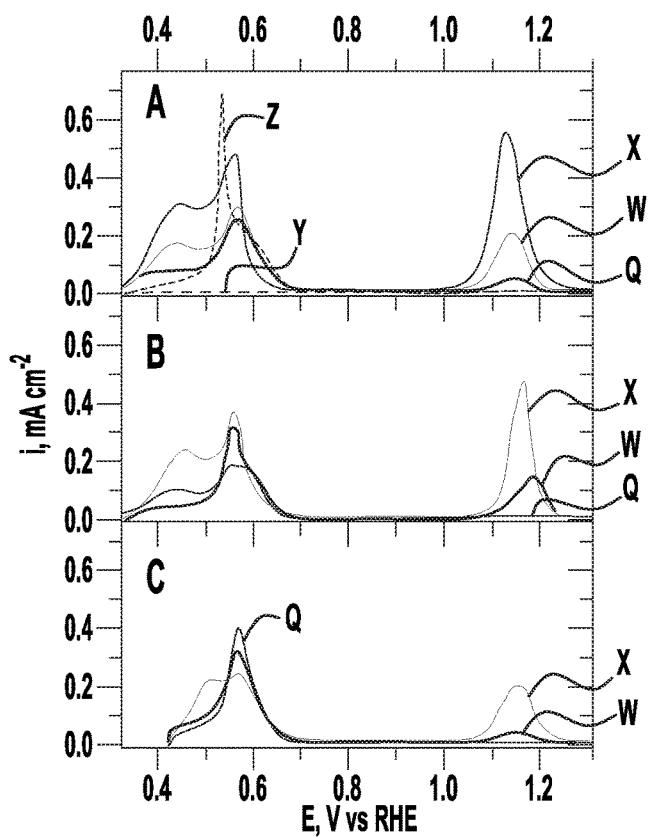
FIG. 5 provides graphs showing the results of linear scan voltammograms recorded at v=0.1 V/s with a Au RDE after holding the potential at $E_{hold}$=0.325 V with the electrode rotating at ω=1500 rpm in 0.1 M $HClO_4$, 1.2 mM $Cu(ClO_4)_2$ and 1 mM (Panel A) or 0.01 mM purified $Na_2SeO_4$ (Panel B) solutions for $t_{hold}$=10 (Q), 100 (W) and 1000 s (X). The data in Panel C was collected under identical conditions as in Panel A, for $E_{hold}$=0.425 V. Also shown in Panel A are corresponding curves acquired in purified 1 mM $Na_2SeO_4$ (Y) and 1.2 mM $Cu(ClO_4)_2$ (Z) in 0.1 M $HClO_4$ solution for $t_{hold}$=1000 s.
Figure 6:
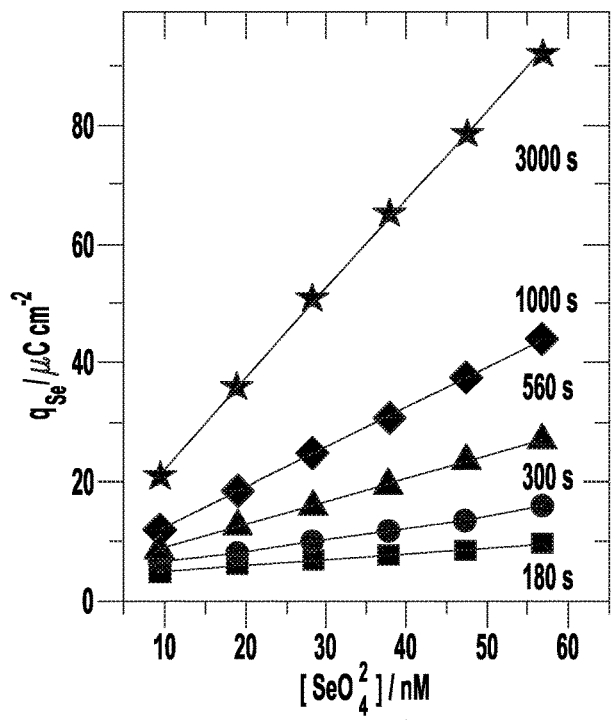
FIG. 6 provides a graph showing plots of $q_{Se}$ vs the concentration of purified $Na_2SeO_4$ in 1.2 mM $Cu(ClO_4)_2$ and 0.1 M $HClO_4$ for $[SeO_4^{2-}]$ in the range 9.48 to 56.88 nM extracted from data of the type shown in Panel A, FIG. 2 ($E_{hold}$=0.325 V vs RHE) for various values of thold. Currents between 1.05-1.3 V were integrated, to yield charges which were then corrected by subtracting capacitive currents recorded with a linear sweep initiated from 0.7 V without any prior potential hold.

An experiment carried out under the same conditions as those in Panel A, FIG. 5, in which the concentration of $Na_2SeO_4$ was reduced by two orders of magnitude (see Panel B, FIG. 5) yielded values of $q_{Se}$ only 3, 1.5 and 1.37 times smaller than in Panel A, for $t_{hold}$=10, 100 and 1000 s, respectively. Prompted by these results, systematic measurements were performed using purified $Na_2SeO_4$ at concentrations in the range 9.48 to 56.88 nM, yielding, for fixed $t_{hold}$, linear correlations between $q_{Se}$ and $[SeO_4^{2-}]$, illustrating the power of this method for analytical applications. As shown in FIG. 6, the lowest concentration detected was 0.75 ppb Se, which is well below the 50 ppb maximum contaminant level established by the US Environmental Protection Agency for drinking water.

Summary

Underpotential deposited Cu on Au(poly) in 0.1 M $HClO_4$ has been found to reduce solution phase $SeO_4^{2-}$ to yield a thin layer of $Cu_xSe$, which upon subsequent oxidation produces sequentially a layer of elemental Se and adsorbed $SeO_3^{2-}$ at more positive potentials. This novel method not only offers great advantages over those reported in the literature in that it avoids harsh and/or complex procedures for chemical reduction of $SeO_4^{2-}$ prior to electrochemical assay, but also displays high enough sensitivity to allow detection of $SeO_4^{2-}$ down to the sub ppb range. Evidence was also presented suggesting previous claims of direct reduction of $SeO_4^{2-}$ were compromised by the presence of $SeO_3^{2-}$ impurities.

Figure 7:
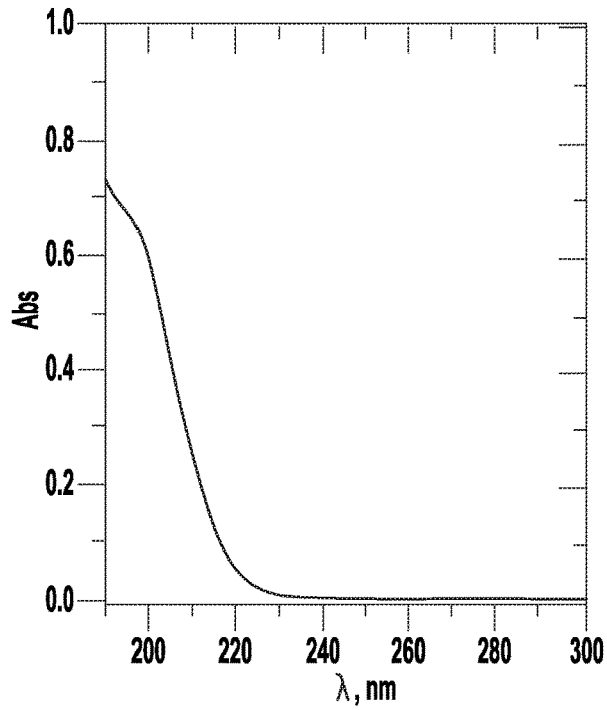
FIG. 7 provides a graph showing the UV visible spectra of a solution of 2 mM $Na_2SeO_4$ (HP) in aqueous 0.1 M $HClO_4$.
Figure 8:
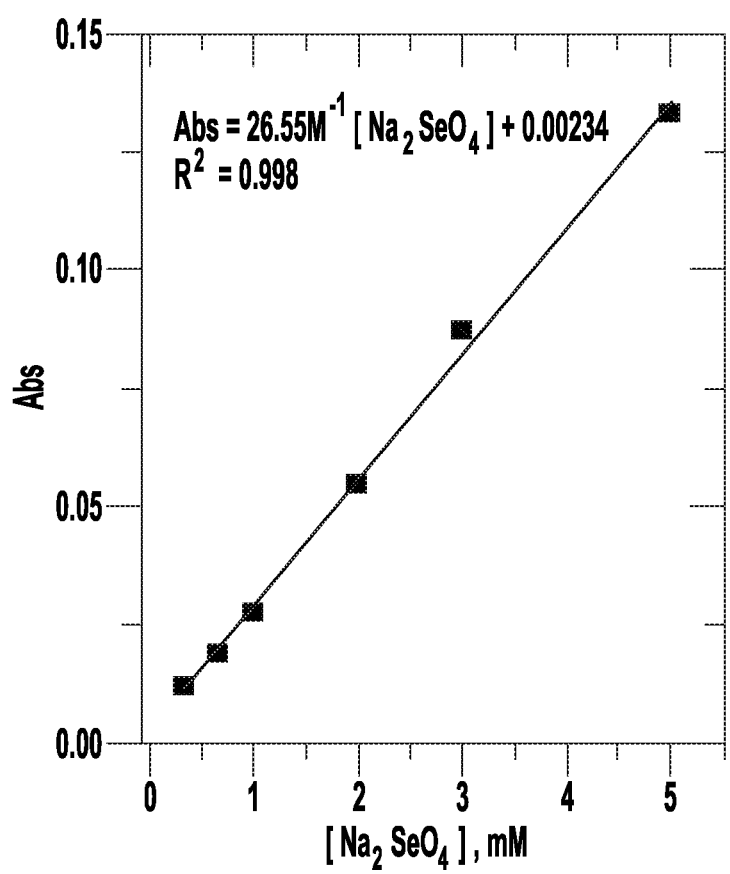
FIG. 8 provides a graph showing the plot of the absorbance at λ=220 nm vs the concentration of $Na_2SeO_4$ in aqueous 0.1 M $HClO_4$.

Example 2: The Reduction of Selenate Mediated by Underpotential Deposited Copper on Gold Electrodes in Acid Solution $TiO_2$ is close to 100% effective for adsorbing $SeO_3^{2-}$ at concentrations on the order of 10 $\mu$M in solutions of pH$\leq$3, but does not adsorb $SeO_4^{2-}$. Gruebel et al., Environ. Sci. Technol., 29, 586 (1995). In our case, ca. 30 g/L of $TiO_2$ (Aldrich, 99.9+%, 1 $\mu$m particle size) were dispersed in ca. 0.2 M $SeO_4^{2-}$ solutions (prepared with 99.9% Alfa Aesar $Na_2SeO_4 \cdot 10H_2O$) in 0.1 M $HClO_4$, and kept under stirring overnight. The mixture was then filtered and the overall procedure was repeated three times, yielding purified $SeO_4^{2-}$. The concentration of $SeO_4^{2-}$ in such purified solutions was determined by transmission UV-Vis spectroscopy, using the absorbance at 220 nm for standardization. Shown in FIG. 7 is a UV-Vis spectrum of 2 mM $Na_2SeO_4$ (HP) in aqueous 0.1 M $HClO_4$ collected with a Varian Cary 50 Bio UV-Visible spectrophotometer using a quartz cuvette. The absorbance at $\lambda$=220 nm was found to be linear with the concentration of $Na_2SeO_4$ (HP) (see FIG. 8), enabling the actual concentration $Na_2SeO_4$ to be determined following purification with $TiO_2$.

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A method for removing selenate from an aqueous selenate-containing solution, comprising the steps of:
   adding sufficient acid to the aqueous selenate-containing solution to acidify the aqueous selenate-containing solution;
   contacting the acidic aqueous selenate-containing solution with an underpotential copper-coated electrode; and
   removing selenate from the aqueous selenate-containing solution by forming copper-selenide on the underpotential copper-coated electrode.

2. The method of claim 1, wherein the underpotential copper-coated electrode is formed by contacting an electrode with an acidic copper-containing aqueous solution and applying sufficient potential to the electrode to form an underpotential copper-coated electrode.

3. The method of claim 2, wherein the copper-containing aqueous solution is formed by contacting an acidic aqueous selenate-containing solution with a copper (II) salt.

4. The method of claim 2, wherein the potential of the electrode is from about 0.55 to 0.33 V RHE during formation of the underpotential copper-coated electrode.

5. The method of claim 1, wherein the electrode is a gold electrode.

6. The method of claim 1, further comprising the step of regenerating the electrode.

7. The method of claim 6, wherein the electrode is regenerated by removing copper from the copper-selenide-coated electrode, and then releasing selenium from the electrode by applying a positive voltage to the electrode.

8. The method of claim 1, wherein the acidic aqueous selenate-containing solution has a pH from about 0.8 to about 1.5.

9. The method of claim 1, wherein the acid is $HClO_4$.

10. The method of claim 1, wherein the aqueous selenate-containing solution also comprises selenite, and the method also removes selenite from the aqueous selenate-containing solution.

11. A method for detecting selenate in an aqueous solution, comprising the steps of:
    adding sufficient acid to the aqueous solution to acidify the aqueous solution;
    contacting the acidic aqueous solution with an underpotential copper-coated electrode; and
    scanning the potential of the electrode above 1.0 V vs. RHE to determine if it is coated with copper selenide.

12. The method of claim 11, wherein the electrode is a gold electrode.

13. The method of claim 11, wherein the underpotential copper-coated electrode is formed by contacting an electrode with an acidic copper-containing aqueous solution and applying sufficient potential to the electrode to form an underpotential copper-coated electrode.

14. The method of claim 13, wherein the copper-containing aqueous solution is formed by contacting an acidic aqueous selenate-containing solution with a copper (II) salt.

15. The method of claim 13, wherein the potential of the electrode is from about 0.55 to 0.33 V RHE during formation of the underpotential copper-coated electrode.

16. The method of claim 11, wherein the acidic aqueous solution has a pH from about 0.8 to about 1.5.

17. The method of claim 11, wherein the acid is $HClO_4$.

18. The method of claim 11, wherein the aqueous solution is drinking water.

19. A system for detecting or removing selenate from an aqueous solution, comprising:
    a first container holding an acidic aqueous solution including selenate;
    an underpotential copper-coated electrode positioned in contact with the acidic aqueous solution including selenate;
    a counter electrode positioned in contact with the acidic aqueous solution including selenate;
    a RHE electrode positioned in contact with the acidic aqueous solution including selenate, and
    a voltage source connected to and capable of applying a voltage to the underpotential copper-coated electrode, wherein application of voltage to the copper-coated electrode converts the electrode to a copper-selenide-coated electrode.

20. The system of claim 19, wherein the underpotential copper-coated electrode is a gold electrode.

21. The system of claim 19, wherein the system further comprises a second container holding an aqueous solution for receiving selenite from the copper-selenide-coated electrode.

22. The system of claim 19, wherein the acidic aqueous solution has a pH from about 0.8 to about 1.5.

* * * * *